United States Patent [19]
Alford

[11] Patent Number: 5,226,729
[45] Date of Patent: Jul. 13, 1993

[54] AVERAGING TEMPERATURE PROBE

[75] Inventor: Malcolm L. Alford, Euless, Tex.

[73] Assignee: Lennox Industries Inc., Dallas, Tex.

[21] Appl. No.: 957,732

[22] Filed: Oct. 7, 1992

[51] Int. Cl.$^5$ ............... G01F 1/68; G01K 3/02
[52] U.S. Cl. ............... 374/115; 73/204.22; 236/78 B; 374/135
[58] Field of Search ............... 374/115, 112, 135, 110, 374/152; 236/78 B; 73/204.22

[56] References Cited

U.S. PATENT DOCUMENTS

| | | |
|---|---|---|
| 1,659,804 | 2/1928 | Brown . |
| 3,112,880 | 12/1963 | Pollock . |
| 3,563,460 | 2/1971 | Nine ............... 236/78 B X |
| 3,596,518 | 8/1971 | Kirkpatrick . |
| 3,623,367 | 11/1971 | Benedict ............... 374/115 X |
| 4,186,605 | 2/1980 | Bourigault . |
| 4,403,516 | 9/1983 | Mailliet et al. . |
| 4,494,406 | 1/1985 | Kommons et al. ............... 73/204.22 |
| 4,729,424 | 3/1988 | Mizuno et al. ............... 236/78 B X |
| 4,863,279 | 9/1989 | Markel et al. ............... 374/115 X |
| 4,915,507 | 4/1990 | Janotta . |
| 4,969,749 | 11/1990 | Hasselman . |
| 5,051,717 | 9/1991 | Hayden ............... 374/208 |
| 5,064,506 | 11/1991 | Sparenberg et al. . |

FOREIGN PATENT DOCUMENTS 82422  7/1981 , Japan ............... 374/115

OTHER PUBLICATIONS

Honeywell Brochure, "Averaging Temperature Sensors-C7100B", Energy Products Center, Form No. 60-2439.

MINCO Brochure, "EMCS Temperature Sensors, Resistance thermometers and transmitters for Energy Monitoring and Control Systems", Section 3.

National Semiconductor Corporation Brochure, "Linear Databook 2", 40042, Rev. 1.

Primary Examiner—Daniel M. Yasich
Attorney, Agent, or Firm—Allegretti & Witcoff, Ltd.

[57] ABSTRACT

An averaging temperature probe is disclosed wherein a sensor strip extends from a mounting plate substantially across a stratified airflow. Temperatures at points spaced along the sensor strip are measured and averaged by circuitry to provide a more accurate representation of the actual or mixed airflow temperature.

19 Claims, 2 Drawing Sheets

AVERAGING TEMPERATURE PROBE

BACKGROUND OF THE INVENTION

The present invention relates generally to a temperature probe and more particularly to a probe for sensing or determining the actual or average temperature of a stratified airflow.

Air processing systems based upon a temperature measurement of airflow exiting the heat exchanger have been attempted. Unfortunately, due to uneven airflow patterns, uneven operation within the heat exchanger, wall losses and plenum/duct geometries, the airflow temperature is often stratified, i.e., varies significantly within a plane substantially perpendicular to the direction of flow. As the airflow moves through the supply air ductwork, mixture occurs such that the supply air enters the zone at a relatively uniform temperature, i.e., without substantial stratification.

The difficulty resides in measuring the true or average temperature of the stratified airflow. A false high or low measurement, due to stratification, causes inefficient operation and energy waste.

SUMMARY OF THE INVENTION

In a principal aspect, the present invention is a temperature probe for monitoring the temperature of an airflow within a plenum. The probe includes a plate mounting and a sensor strip extending from the plate into the airflow.

The temperature of the sensor strip is measured at first and second points by a point monitor mechanism, which produces first and second point signals, respectively. An average or averaging circuit receives these point temperature signals and responsively provides a temperature signal representative of the average airflow temperature. In a typical application, this temperature signal is inputted to a system controller which coordinates operation of the components of the air processing system.

It is thus an object of the present invention to provide a new and improved temperature probe for sensing the average temperature of an airflow. Another object is a reliable temperature probe capable of operation in low and high airflow applications. Yet another object is a low cost, easily installed temperature probe substantially immune to electrical noise. It is yet another object of the present invention to provide a temperature averaging probe for a stratified airflow wherein both mechanical and electrical averaging is achieved. Still another object is a temperature probe which allows the use on conventional heating and cooling apparatus in zoned air processing systems.

These and other features, objects and advantages of the present invention are described or apparent in the following detailed description of a preferred embodiment.

BRIEF DESCRIPTION OF THE DRAWING

A preferred embodiment of the present invention is described, in detail, with reference to the drawing wherein.

DETAILED DESCRIPTION A OF PREFERRED EMBODIMENTS

Figure 1:
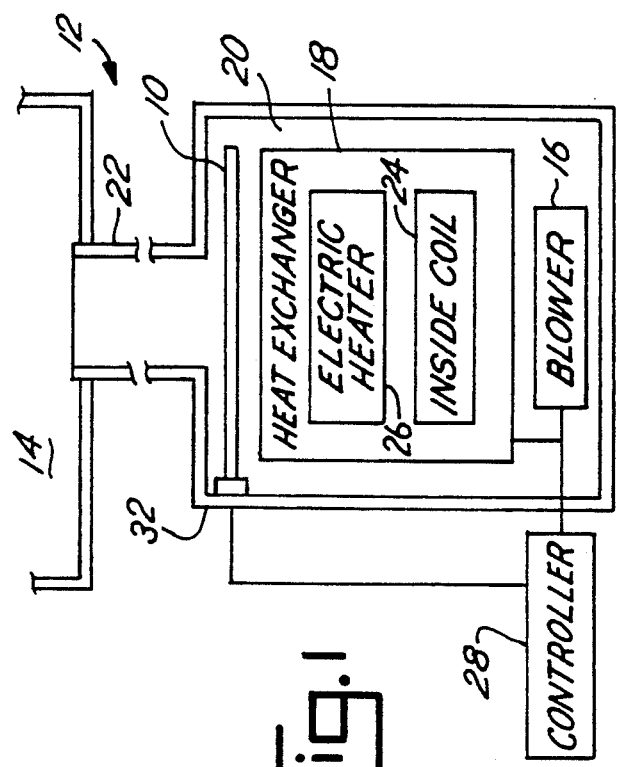
FIG. 1 is a schematic representation of an air processing system.
Figure 2:
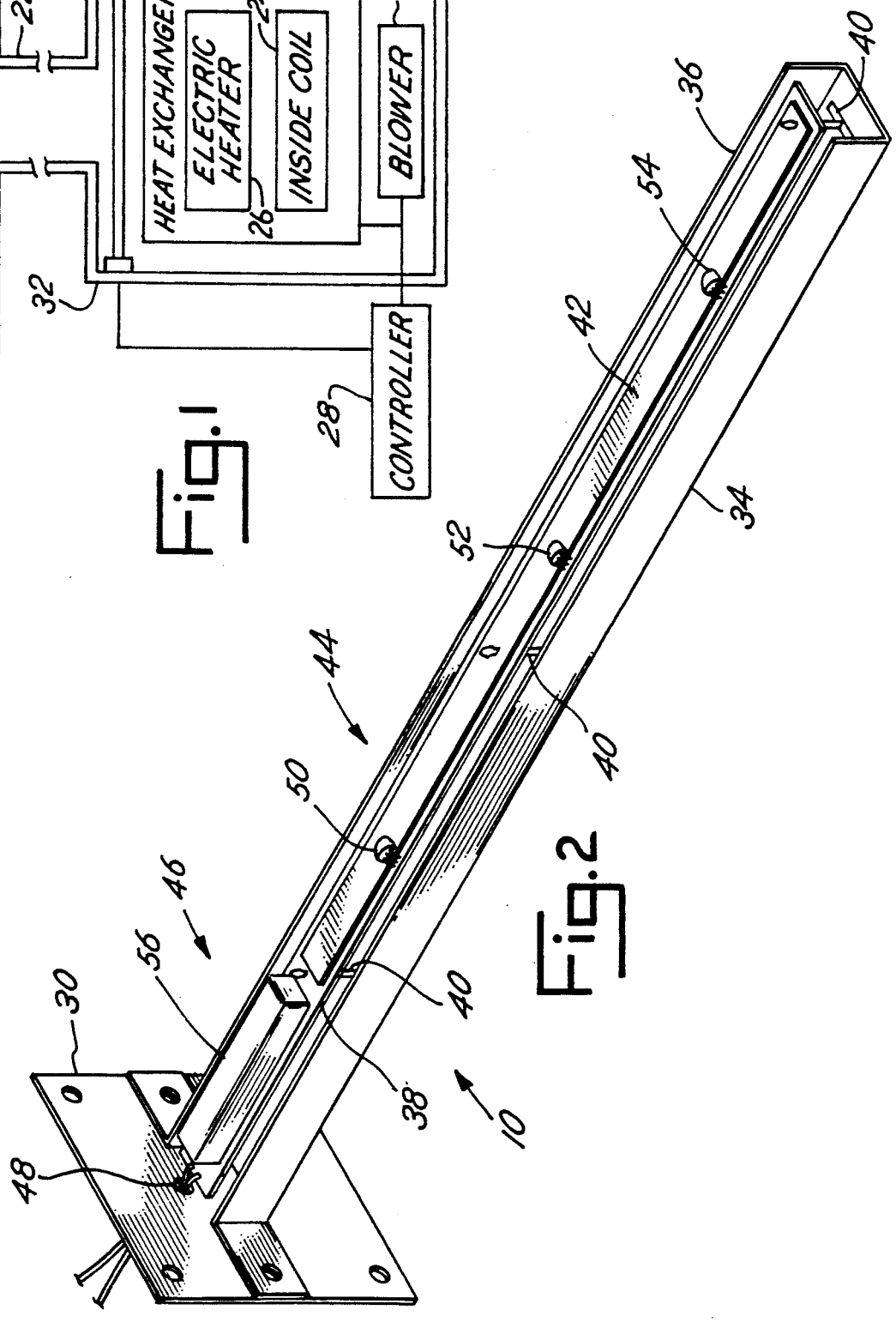
FIG. 2 is a perspective view of the temperature probe shown in FIG. 1.
Figure 3:
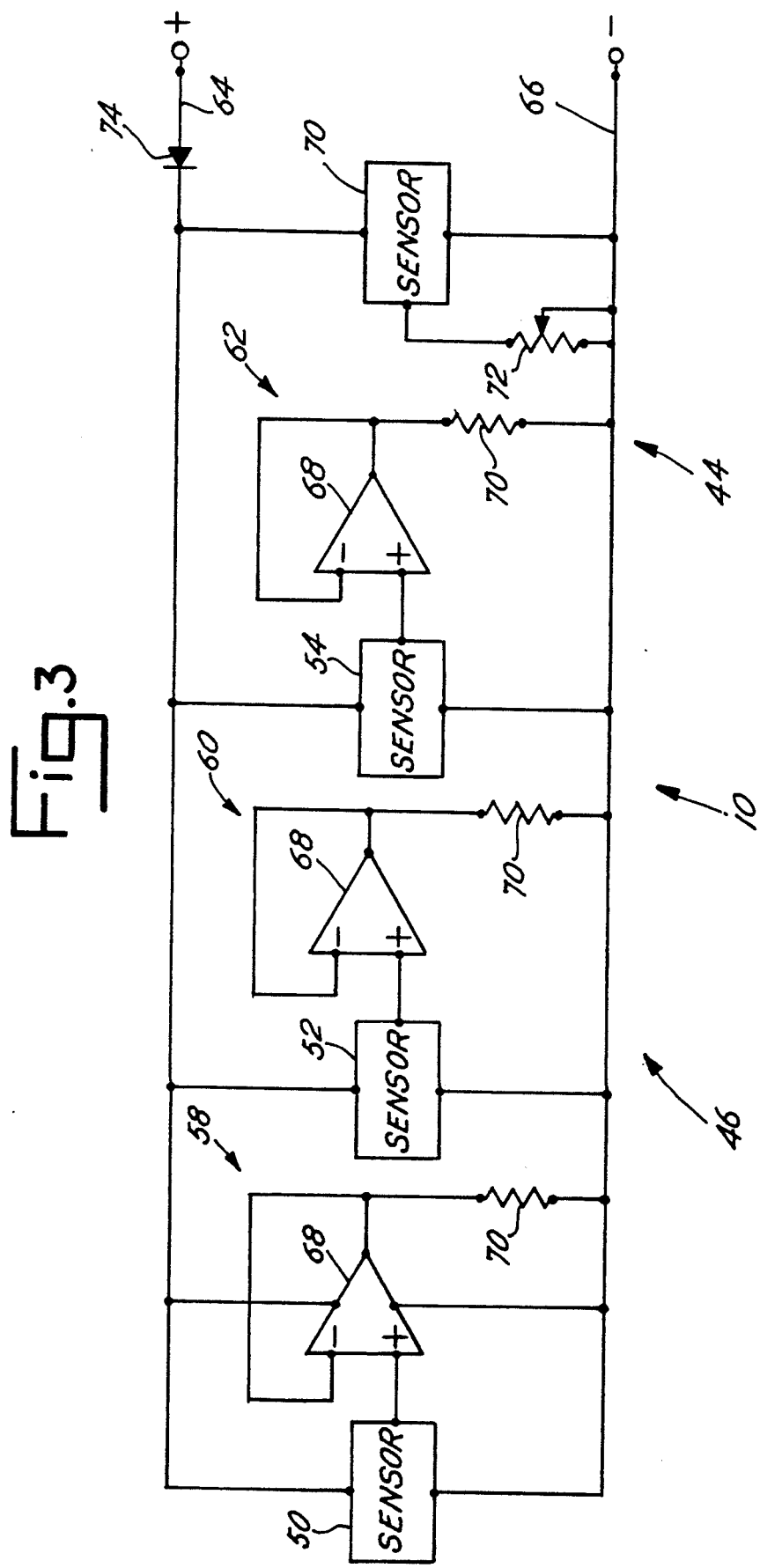
FIG. 3 is an electrical schematic of the probe shown in FIG. 1.

A preferred embodiment of the present invention is shown in FIGS. 1-3 as a temperature probe 10 for use with a conventional air processing system 12. The system 12 processes or conditions the air in an enclosure or zone 14. The system 12 includes a blower 16, a heat exchanger 18 positioned within a plenum 20, and a duct 22 for delivering processed air to the enclosure 14. As used herein, the term "processed air" includes heated air, cooled air, or both. In this preferred embodiment, the heat exchanger 18 houses an inside coil 24 of a conventional heat pump (not otherwise shown) and an auxiliary electric heater 26, downstream of the inside coil 24.

The temperature of a processed supply air departing the heat exchanger 18 is nonuniform and varies within the plenum 20 throughout a plane generally perpendicular to the direction of airflow. The temperature probe 10, secured within and extending substantially across the plenum 20, senses a series of distributed airflow temperatures and responsively provides a temperature signal representing the average temperature of the airflow. The average temperature signal is inputted to a conventional system controller 28 of the air processing system 12. As used herein, the term "average" includes a true average as well as a weighted average, while "mathematical average" means a true average.

Referring now to FIGS. 1-2, the probe 10 includes a mounting plate 30 for securement to a plenum wall 32, such that the probe 10 extends centrally within the plenum 20 and substantially transversely across the airflow pattern.

A shield 34 is affixed to the mounting plate 30 and extends substantially perpendicular thereto. In this preferred embodiment, the shield 34 is a substantially U-shaped sheet metal channel 36, which is open opposite the heat exchanger 18. A circuit board 38 is suspended within the channel 36 by nylon standoffs 40. The channel 36, approximately three-quarter inch ($\frac{3}{4}''$) wide and one-half inch ($\frac{1}{2}''$) high, shields and insulates the circuit board 38 from radiant heating. That is, heat radiating from the heat exchanger 18 is carried or deflected by the channel 36 away from and around the circuit board 38.

A sensor strip 42 is mounted on the circuit board 38 towards the open side of the channel 36. As best shown in FIG. 2, the sensor strip 42 is substantially coextensive with the circuit board 36 and extends substantially across the plenum 20.

The sensor strip 42 is in direct thermal communication with the airflow exiting the heat exchanger 18 and thus provides a temperature profile thereof, i.e., a profile approximating the temperature stratification within the airflow. In this preferred embodiment, the sensor strip 42 has sufficient thermal mass to dampen out any rapid temperature change. In addition, the sensor strip 42 is a good thermal conductor such that the temperature profile is moderated and smoothed between extremes. In this preferred embodiment, the strip 42 is copper, one-half inch ($\frac{1}{2}''$) in width.

The probe 10 further includes point monitor means and average means, generally designated 44, 46, respectively. The point monitor means 44 and the average means 46 are mounted upon the circuit board 38 and electrical interconnections are made in a conventional fashion in the underside thereof. The probe 10 or more particularly the average means 46 is connected to the controller 28 by leads passing through an access opening 48.

The point monitor means 44 senses the temperatures of at least two discrete points along the sensor strip 42 and provides point signals representative of the point temperatures, respectively. In this preferred embodiment, the point monitor means 44 includes first, second and third integrated temperature sensors 50, 52 and 54, in thermal contact with and substantially equally displaced along the strip 42. One suitable sensor is the "LM 34" temperature sensor distributed by National Semiconductor Corporation, Santa Clara, Calif. Each sensor 50, 52 and 54 outputs a substantially linear voltage of ten millivolts per Fahrenheit degree.

Referring now to FIGS. 2 and 3, the average means 46 is enclosed by a housing 56. The average means 46 is coupled and responsive to the point monitor means 44. Based upon the point signals, the average means 46 provides a temperature signal representative of the average temperature for the stratified airflow exiting the heat exchanger 18.

In this preferred embodiment, the average means 46 includes first, second and third averaging circuits, generally designated 58, 60 and 62, connected to the first, second and third sensors 50, 52 and 54 respectively. The sensors 50, 52 and 54 and averaging circuits 58, 60 and 62 are powered by twelve volts, supplied on lines 64 and 66.

The averaging circuits 58, 60 and 62 convert the voltage signals from the point monitor means 44 into current signals, which are proportioned and summed through an interconnection to provide the temperature signal. In this preferred embodiment, each of the averaging circuits 58, 60 and 62 includes an operational amplifier 68 and a resistor 70, interconnected as shown. The operational amplifier 68 functions as a temperature stable current boost, providing a driving current through the resistor 70. The resistor 70 converts the sensor output voltage into a current, and the currents from the averaging circuit 58, 60 and 62 are summed at line 66. The resistors 70 are matched and the cumulative current therefore represents the mathematical average of the point temperatures along the sensor strip 42. A weighted average is achieved by unmatched resistors 70 and may be required in a particularly troublesome application.

The output of the temperature probe 10 is, in this preferred embodiment, substantially linear from four to twenty milliamps for an airflow temperature range of zero to one-hundred fifty Fahrenheit degrees. A voltage regulator 70 and a potentiometer 72, interconnected as shown in FIG. 3, maintain the required minimum current. A diode 74 provides reverse polarity protection.

The temperature probe 10 is compact and easily installed. Significantly the probe 10 as a whole resides within the plenum 20, thereby requiring only a single mounting and a two-lead interconnection with the system controller 28. In addition, the "electrical" averaging process provided by the point monitor means 44 and the average means 46 is enhanced by the thermal conductivity of the sensor strip 42. By conduction between temperature extremes, the strip 42 provides a "mechanical" averaging which enhances the accuracy of the probe 10 and thus the efficiency of the air processing system 12.

Equally significant, the probe 10 enables use of a conventional air processing system 12, such as a two-speed heat pump with an auxiliary electric heater, in a zoned application. Since the probe 10 provides an accurate measurement of supply air temperature, the heat pump can be properly cycled without the need for line pressure sensors or other monitoring equipment. Similarly there is no need for a thermostat on the inside coil to avoid freezing thereof.

A preferred embodiment of the present invention has been described. It is to be understood, however, that changes and modifications can be made without departing from the true scope and spirit of the present invention as defined by the following claims, which are to be interpreted in view of the foregoing.

What is claimed is:

1. A temperature probe comprising, in combination:
   a mounting plate;
   a sensor strip extending substantially transversely from said mounting plate;
   point monitor means for sensing at least first and second point temperatures spaced along said sensor strip and for responsively producing at least first and second point signals representative of said first and second point temperatures, respectively; and
   average means, responsive to said point monitor means, for receiving said first and second point signals and for providing a temperature signal representative of an average of said first and second point temperatures.

2. A temperature probe as claimed in claim 1 wherein said sensor strip is copper.

3. A temperature probe as claimed in claim 1 further comprising a channel secured to said mounting plate, said sensor strip being suspended within said channel.

4. A temperature probe as claimed in claim 3 further comprising a circuit board suspended within said channel, said sensor strip, said point monitor means and said average means being mounted upon said circuit board.

5. A temperature probe as claimed in claim 1 or 4 wherein said point monitor means includes at least first and second temperature sensors in thermal contact with said sensor strip, said first and second temperature sensors providing said first and second point signals, respectively.

6. A temperature probe as claimed in claim 1 wherein said average means includes a first averaging circuit for receiving said first point signal and a second averaging circuit for receiving said second point signal, said first and second averaging circuits cooperating to provide said temperature signal.

7. A temperature probe as claimed in claim 6 wherein said first averaging circuit includes a first operational amplifier connected to a first resistor for generating a first current signal and wherein said second averaging circuit includes a second operational amplifier connected to a second resistor for generating a second current signal.

8. A temperature probe as claimed in claim 7 wherein said first and second current signals are summed to provide said temperature signal.

9. A temperature probe as claimed in claim 8 wherein said sensor strip is copper.

10. A temperature probe as claimed in claim 9 further comprising a channel secured to said mounting plate, said sensor strip being suspended within said channel.

11. A temperature probe as claimed in claim 10 further comprising a circuit board suspended within said channel, said sensor strip, said point monitor means and said average means being mounted upon said circuit board.

12. A temperature probe comprising, in communication:
   a mounting plate;
   a shield secured to and extending substantially transversely from said mounting plate;
   a circuit board within said shield;
   a sensor strip secured along said circuit board;
   point monitor means, mounted on said circuit board and in communication with said sensor strip, for providing at least first and second point signals representative of first and second point temperatures spaced along said sensor strip; and
   average means, mounted on said circuit board and responsive to said point monitor means, for providing a temperature signal representative of an average of said first and second point temperatures.

13. A temperature probe as claimed in claim 12 wherein said shield is a substantially U-shaped channel.

14. A temperature probe as claimed in claim 12 or 13 wherein said sensor strip is copper.

15. A temperature probe as claimed in claim 12 or 13 wherein said point monitor means includes at least first and second temperature sensors for producing said first and second point signals, respectively.

16. A temperature probe as claimed in claim 15 wherein said average means includes a first averaging circuit for receiving said first point signal and a second averaging circuit for receiving said second point signal, said first and second averaging circuits cooperating to provide said temperature signal.

17. A temperature probe as claimed in claim 16 wherein said first averaging circuit includes a first operational amplifier connected to a first resistor for generating a first current signal and wherein said second averaging circuit includes a second operational amplifier connected to a second resistor for generating a second current signal.

18. A temperature probe as claimed in claim 17 wherein said first and second current signals are summed to provide said temperature signal.

19. A air processing system for at least a first zone comprising, in combination:
   a heat exchanger;
   a conventional heat pump including an inside coil within said heat exchanger;
   a blower for drawing a stream of air from said first zone and for moving said stream through said heat exchanger to said first zone;
   a controller for controlling operation of said conventional heat pump and said blower; and
   a temperature probe for sensing the temperature of said stream downstream of said heat exchanger;
   said temperature probe including (i) a mounting plate; (ii) a sensor strip extending substantially transversely from said mounting plate; (iii) point monitor means for sensing at least first and second point temperatures spaced along said sensor strip and for responsively producing at least first and second point signals representative of said first and second point temperatures, respectively; and (iv) average means, responsive to said point monitor means, for receiving said first and second point signals and for providing a temperature signal representative of an average of said first and second point temperatures to said controller.

* * * * *